United States Patent [19]

Stevens et al.

[11] Patent Number: 5,486,821
[45] Date of Patent: Jan. 23, 1996

[54] ARTIFICIAL HORIZON ALTITUDE WARNING SYSTEM

[75] Inventors: David E. Stevens, St. Louis, Mo.; Leonard A. Temme, Pensacola, Fla.

[73] Assignee: The United States of America as represented by the Secretary of the Navy, Washington, D.C.

[21] Appl. No.: 249,658

[22] Filed: May 26, 1994

[51] Int. Cl.$^6$ ................................................. G08B 23/00
[52] U.S. Cl. .......................... 340/970; 340/974; 340/977; 340/980
[58] Field of Search ....................... 340/970, 973, 340/974, 975, 980, 977, 982; 342/29; 345/7, 139; 364/433, 434

[56] References Cited

U.S. PATENT DOCUMENTS

| | | | |
|---|---|---|---|
| 4,397,555 | 8/1983 | Malcolm et al. | 340/980 |
| 4,616,226 | 10/1986 | Morley | 340/980 |
| 4,743,903 | 5/1988 | Morley | 340/980 |
| 4,936,142 | 6/1990 | Davidson | 73/179 |
| 5,038,141 | 8/1991 | Grove | 340/970 |
| 5,072,218 | 12/1991 | Spero et al. | 340/980 |
| 5,075,685 | 12/1991 | Vermilion et al. | 340/970 |
| 5,134,394 | 7/1992 | Beadle | 340/975 |
| 5,187,478 | 2/1993 | Grove | 340/970 |
| 5,214,425 | 5/1993 | Wreede | 340/980 |
| 5,218,355 | 6/1993 | Burkhardt | 340/980 |
| 5,220,322 | 6/1993 | Bateman et al. | 340/970 |
| 5,321,415 | 6/1994 | Mount | 340/980 |
| 5,334,995 | 8/1994 | Iino | 340/980 |

OTHER PUBLICATIONS

Bellenkes, A. H., "Human Factors Engineering", *Aeromedical Newsletter*, (Mar. 1992), 92–3, pp. 13–16.
Cohen, M. M., "Pilot Disorientation During Aircraft Catapult Launchings at Night: Historical and Experimental Perspectives", *Aeromedical & Training Digest*, (Jul., 1992), vol. 6, No. 3.
Nordwall, B. D., "Pilots Sense Attitude With Peripheral Vision Using New Garrett Display", *Aviation Week & Space Technology*, (May 8, 1989), pp. 97–99.
NASA Conference Publication 2306, "Peripheral Vision Horizon Display (PVHD)", (Mar. 15–16, 1983).

*Primary Examiner*—John K. Peng
*Assistant Examiner*—Benjamin C. Lee
*Attorney, Agent, or Firm*—A. David Spevack; William C. Garvert

[57] ABSTRACT

An artificial horizon altitude warning system is provided for helping to prevent a controlled flight of an aircraft into the ground. The artificial horizon altitude warning system comprises an altimeter for gathering altitude information about the aircraft and generating an altitude signal; a laser assembly for producing a light in a cockpit of the aircraft; and a controller for receiving the altitude signal and for positioning the light in the cockpit to form an artificial line based on the altitude signal, the artificial line being positioned so as to be disposed along tin arcuate length corresponding to the location of an actual horizon as viewed by a pilot of the aircraft.

18 Claims, 3 Drawing Sheets

VISUAL HORIZON ANGLE VERSUS AGL ALTITUDE
(Low Altitude)

VISUAL HORIZON ANGLE VERSUS AGL ALTITUDE
(Continued through medium altitude)

ARTIFICIAL HORIZON ALTITUDE WARNING SYSTEM

BACKGROUND OF THE INVENTION

1. Field of the Invention

The purpose of this invention is to provide an aircraft pilot with an indication and warning of ground proximity via subconscious peripheral vision cues.

2. Description of the Prior Art

Over fifty percent of tactical aircraft fatalities occur due to impact with the ground during low altitude maneuvering. An United States Air Force study completed in 1984 showed that although low altitude flight accounted for only 10 percent of all tactical flight hours, 57 percent of the fatalities occurred in this regime. Considering night flights alone, the U.S. Navy lost 21 aircraft with 49 fatalities between 1986 and 1991 due to controlled flight into the ground or water. The term "controlled flight" indicates that the pilot literally flew the aircraft into the ground or water. Controlled flight into the ground during approach and departure account for the majority of all fatal spatial disorientation mishaps. Fatal spatial disorientation mishaps in all types of aviation (military, civil and commercial) have remained at a relatively constant 15 percent since accident statistics have been kept. These aircraft accidents continue to occur despite sophisticated ground proximity detection devices.

There are a number of systems used for ground proximity detection. Most consist of an altimeter that may be coupled with a vertical descent speed measuring device. The altimeters generally use reflected electromagnetic energy, as in a radar altimeter, to measure the distance Above Ground Level (AGL). The vertical descent rate input, when used, consists of measuring the rate of change in barometric pressure, or in sophisticated aircraft, inertial or radar measured descent rate. These become ground proximity warning devices when combined with a pilot selected threshold altitude and a visual and/or aural warning. When the aircraft descends below the selected threshold altitude, a warning is generated. There have been very few documented incidents of altimeter or ground proximity warning device failure. There have been many incidents of controlled flight into the ground with working ground proximity warning devices.

If the ground proximity warning devices are operating and set properly, there are three possibilities that account for controlled flight into the ground: (1) the pilot is consciously ignoring the warning; (2) the pilot is not consciously aware of the warning; or (3) there is insufficient time from warning to ground impact for the pilot to react. If we dismiss the first as a suicidal act, we are left with possibilities (2) and (3). This requires an examination of how the warning is imparted to the pilot.

Current ground proximity indicators present their warning via several methods or combinations of methods. These include: analog AGL altitude displays; digital AGL altitude displays; altitude warning tones; pre-recorded voice warning, e.g., "altitude" or "pull-up"; instrument panel warning lights; and visual warning symbols, e.g., a flashing "X" in the Head Up Display (HUD). It is possible for a pilot to be consciously unaware of an aural or visual warning. During periods of high stress and information overload, the human mind can fixate on one task and suppress or ignore information presented aurally or by the central vision. Low altitude flight, particularly during landing approach or low altitude maneuvering, generally requires high rates of information processing and is often stress inducing. To ensure the pilot is aware of the warning, the warning must surpass or override competing aural or visual sensory input. If the warning is not sufficiently compelling, the warning may be heard or seen but not perceived.

There are several U.S. Patents on ground proximity detection devices which function as described above. For Example, U.S. Pat. No. 5,187,478, by GROVE, discloses a descent rate warning system which alerts a pilot that there current descent rate may place the aircraft in danger. U.S. Pat. No. 5,220,322, by BATEMAN et al, discloses a proximity warning system which takes into consideration the degradation in performance of an aircraft near the ground. U.S. Pat. No. 5,038,141, by GROVE, discloses a ground proximity warning system which takes into consideration the flight configuration of the aircraft. U.S. Pat. 5,075,685, by VERMILION et al., discloses a altitude warning system having an audio warning when predetermined altitude parameters are exceeded. U.S. Pat. No. 5,134,394, by BEADLE, discloses a navigation apparatus which displays both altitude and attitude information in close proximity to each other. U.S. Pat. No. 4,936,142, by DAVIDSON, discloses a vertical speed indicator which may be used to accurately determine ground proximity.

Another concern with respect to preventing fatal spatial disorientation mishaps is the ability of the pilot to determine the current attitude, i.e., the orientation of the aircraft relative to a horizon, and to correct the attitude of the aircraft to prevent a controlled flight into the ground. Peripheral Vision Horizon Displays (PVHDs) were designed to assist in determining the attitude of an aircraft. These PVHDs were developed in the early 1980s and were limited to projection on the front instrument panel of the cockpit.

There are several examples of these PVHDs which are disclosed in U.S. Patents. For example, U.S. Pat. Nos. 4,616,226 and 4,743,903, both by MORLEY, disclose artificial horizon devices which illustrate aircraft attitude by projecting an artificial horizon on the instrument panel of the aircraft. The artificial horizon simulates aircraft pitch and roll by drawing the artificial horizon with respect to a vertical or horizontal line. The MORLEY device has the disadvantage of not being able to detect altitude, i.e., the height of the aircraft from the ground. U.S. Pat. No. 5,218,355, by BURKHARDT, discloses an artificial horizon device which also illustrates aircraft attitude by projecting an artificial horizon on an instrument panel of an aircraft. Finally, U.S. Pat. No. 5,072,218, by SPERO et al., discloses a HUD which provides attitude information to a pilot via a helmet.

SUMMARY OF THE INVENTION

It is therefore an object of the present invention to provide an artificial horizon altitude warning system which will help to prevent a controlled flight of an aircraft into the ground.

It is a further object to provide a system which will utilize the peripheral vision of a pilot so that the pilot may reduce reaction time and thereby avoid a collision with the ground.

It is yet another object to provide a warning system which not only provides information about altitude but also provides attitude information on the aircraft.

It is yet another object to provide a means for displaying the artificial horizon when the actual horizon is not visible.

In all of the above embodiments, it is an object to provide a means for rapidly moving an artificial horizon line above an actual horizon when the altitude signal falls below a predetermined value.

Finally, it is an object of the invention to provide an altitude warning device which functions in conjunction with subconscious responses to reduce the response time associated with controlled flight crashes.

According to one broad aspect of the present invention, there is provided an artificial altitude warning system which comprises a means for gathering altitude information about the aircraft and generating an altitude signal; a light generating means for producing a light in a cockpit of the aircraft; and a control means for receiving the altitude signal and for positioning the light in the cockpit to form an artificial line based on the altitude signal, the artificial line being positioned so as to be disposed along an arcuate length corresponding to the location of an actual horizon as viewed by a pilot of the aircraft.

According to another broad aspect of the invention, there is provided an artificial altitude warning system which comprises a means for gathering altitude information about the aircraft; a means for gathering attitude information about the aircraft, the attitude information comprising at least pitch and roll information; a light generating means for producing a light in a cockpit of the aircraft; and a control means for receiving the altitude and attitude information and for positioning the light in the cockpit to form an artificial line based on the altitude and attitude :information, the artificial line being positioned so as to be disposed along an arcuate length in the cockpit.

According to yet another broad aspect of the invention, a method for providing a warning when a controlled flight of an aircraft will result in a collision with the ground is provided. The method comprising the steps of: (a) generating a signal indicative of an altitude of said aircraft; (b) projecting a light source on a cockpit so that said light source forms an artificial line based on said altitude signal, said artificial line being positioned so as to be disposed along an arcuate length corresponding to the location of an actual horizon as viewed by a pilot of said aircraft; and (c) dynamically adjusting said artificial line so as to be disposed at the intersection of a ray and said cockpit, said ray being defined by a visual horizon angle, said visual horizon angle being defined by:

$$x = \sin^{-1}\left[\frac{R}{A+R}\right]$$

where, x is said visual horizon angle, R is the radius of the earth, and A is the altitude of said aircraft, said visual horizon angle being measured from a line extending from a pilot's eye to the actual horizon and from said pilot's eye to the center of the earth.

Other objects and features of the present invention will be apparent from the following detailed description of the preferred embodiment.

BRIEF DESCRIPTION OF THE DRAWINGS

The invention will be further described in conjunction with the accompanying drawings, in which.

DETAILED DESCRIPTION OF THE PREFERRED EMBODIMENT

Figure 1:
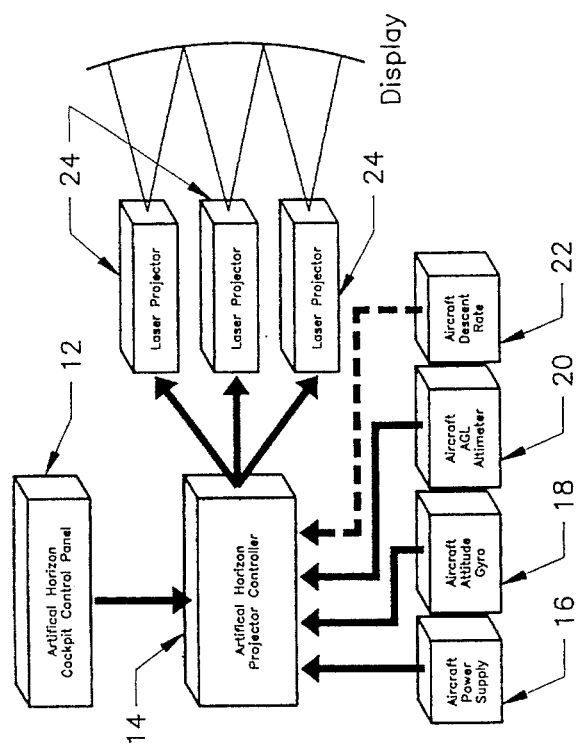
FIG. 1 is a block diagram of the key components of the artificial horizon altitude warning system constructed in accordance with a preferred embodiment of the invention.

With reference to the Figures, wherein like reference characters indicate like elements throughout the several views and, in particular, with reference to FIG. 1, an Artificial Horizon Altitude Warning System (AHAWS), generally denoted 10, is illustrated. To appreciate the significance of the AHAWS, it is necessary to discuss how a pilot gathers and processes audio/visual warning information.

Due to the symbolic representation of warnings, e.g., digit, word, tone, light; information from prior art ground proximity and attitude systems must be visually or aurally detected, perceived and then cognitively interpreted before the pilot may react. Using the Human Processor Model, developed by Stuart Card and Thomas Moran in 1983, we may quantify reaction times for these processes. Assuming a combination auditory/visual low altitude warning is generated, and the pilot is positioned in the cockpit such that no head movement, only eye movement, is required to view the warning and display, an accurate simulation of reaction time may be generated. According to the Human Processor Model, nine discreet steps must occur between warning generation and pilot reaction. These steps and the times required are listed in chronological order in Table 1. The times used are based on empirical data of related tasks. A summary of the process follows. A sensory signal must first be detected. This auditory or visual stimulus must be cognitively compared with working memory. A judgment to examine the altitude display is generated next. The pilot's eyes must move to the altitude display to confirm the warning. Tests show that pilots rarely react based on a warning alone. Then the altitude display must be visually detected and perceived, followed by cognitive comparison with desired altitude. Another cognitive processing cycle is required to determine the action required to correct the aircraft attitude. Finally, motor movement is required to activate the aircraft controls to recover. The minimum time from warning generation to pilot reaction is approximately 970 milliseconds.

If a warning could be presented such that it was perceived without a need for eye movement and with flexive interpretation, reaction time could be reduced. With the elimination of 5 of the 9 steps, total reaction time would drop by two-thirds to approximately 310 milliseconds, see Table 2.

A system that presents ground proximity to the pilot at a subconscious level will significantly decrease pilot reaction time and make the warning more compelling. When a person falls, there is a reflective action that thrusts the hands out in the direction of the fall. Animal tests indicate that this reflex is produced from a combination of vestibular and peripheral vision cues. The peripheral vision through the subconscious mind indicates that the horizon is rising unacceptably fast. Pilots have used a "rising horizon" to judge decent rate for approach and landing since the Wright brothers. Peripheral horizon cues provide

TABLE I

Human Processor Model cycle times for aural/visual low altitude warnings in milliseconds.

| TYPE OF ACTION | TIME (MSEC) | DATA ORIGIN |
|---|---|---|
| Warning Detection: hear/see warning | 100 | Ganz |
| Warning Perception: understand warning | 47 | Cavanaugh |
| Cognitive Judgment: check altitude | 106 | Welford |
| Eye Movement: look toward altimeter | 230 | Russo |
| Display Detection: see altimeter | 100 | Ganz |
| Display Perception: understand altitude | 117 | Cavanaugh |
| Cognitive Judgment: compare altitude | 106 | Welford |
| Cognitive Judgment: decide to act | 92 | Welford |
| Motor Movement: pull stick back | 70 | Keele |
| TOTAL REACTION TIME REQUIRED | 968 | | a powerful subconscious indication of ground proximity and closure. However, in conditions where no horizon is discernible due to darkness or weather, these cues do not exist. During low altitude maneuvering, these cues often come too late.

The AHAWS 10 uses the artificial horizon concept or "Malcolm Horizon" to subconsciously provide a dynamic altitude warning via peripheral vision cues. The original purpose of the Malcolm Horizon was to prevent spatial disorientation by supplying an artificial horizon when the real horizon is not discernible due to weather or darkness. This artificial horizon is a simulation of the actual horizon and may be projected inside the cockpit. Current applications of the Malcolm Horizon are known as Peripheral Vision

TABLE II

Human Processor Model cycle times for peripheral subconscious low altitude warnings in milliseconds.

| TYPE OF ACTION | TIME (MSEC) | DATA ORIGIN |
|---|---|---|
| Warning Detection: hear/see warning | 100 | Ganz |
| Warning Perception: understand warning | 47 | Cavanaugh |
| Cognitive Judgment: decide to act | 92 | Welford |
| Motor Movement: pull stick back | 70 | Keele |
| TOTAL REACTION TIME REQUIRED | 309 | |

Horizon Displays (PVHDs). These PVHDs were developed in the early 1980s and were limited to projection of attitude information on the front instrument panel of the cockpit.

Figure 4A:
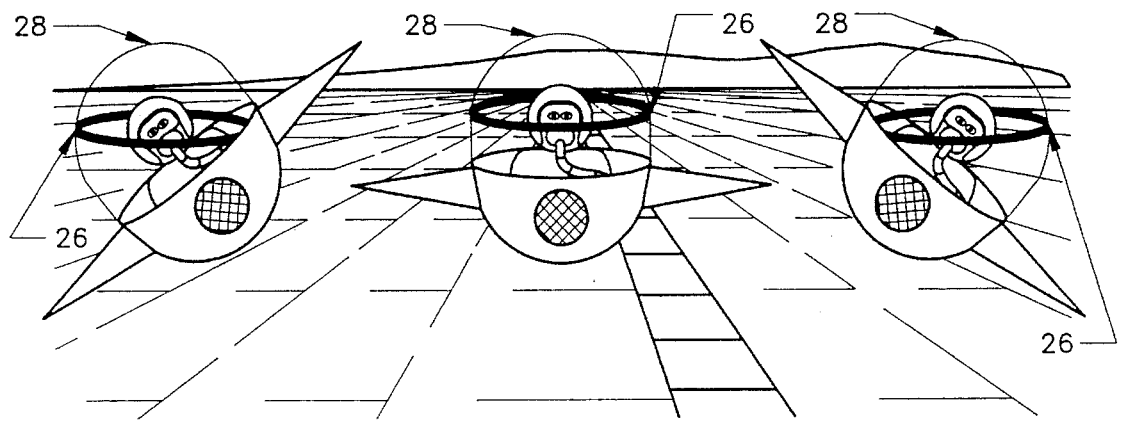
FIGS. 4a and 4b are diagrams showing various positions of an artificial horizon projected in an aircraft by the AHAWS for basic altitude orientation.
Figure 4B:
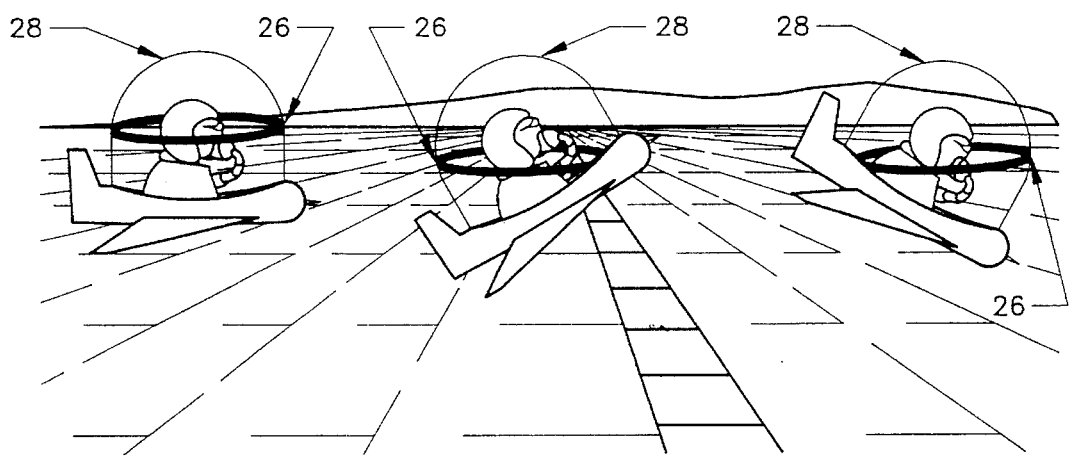
Figure 4C:
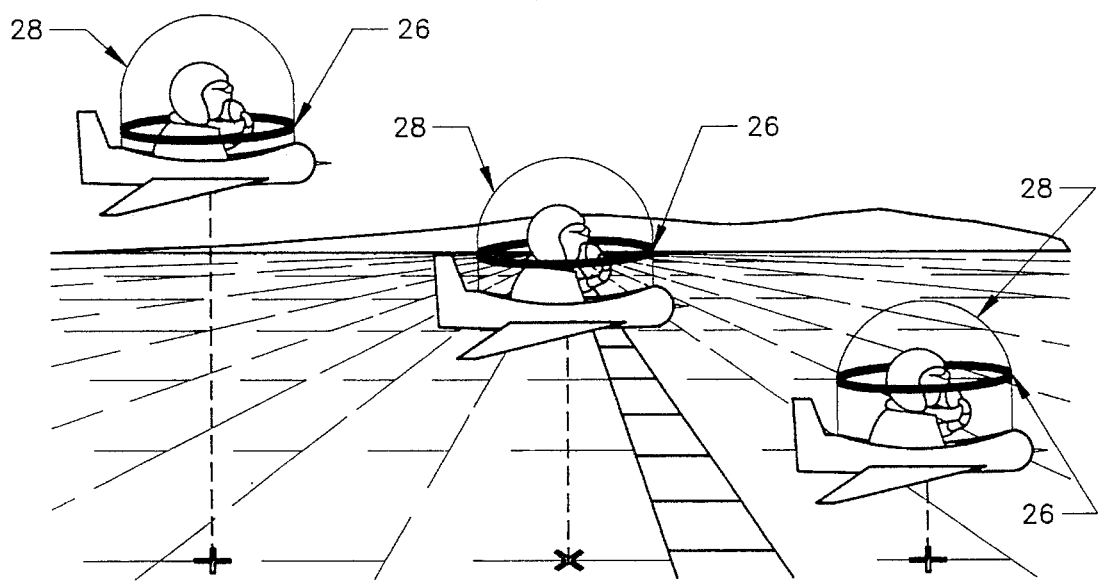
FIG. 4c is a diagram showing various positions of an artificial horizon projected in an aircraft by the AHAWS to provide ground proximity.

The AHAWS requires two modifications to the Malcolm Horizon concept and existing PVHDs: (1) the projection of the artificial horizon is superimposed over the position of the actual horizon and extended to the limits of the pilot's peripheral vision; and (2) the projected image is given a third degree of freedom-elevation. FIGS. 4a and 4b illustrate the basic concept of the extended artificial horizon for spatial orientation. They give a simplified illustration of how an artificial horizon remains parallel to the plane of the actual horizon regardless of aircraft roll (FIG. 4a) or aircraft pitch (FIG. 4b). FIG. 4c illustrates the third degree of freedom, the ability to elevate to simulate ground proximity. Unlike the illustrations, an artificial horizon is intended to be used when the actual horizon is not visible to the pilot. Additional projection outside of the pilot's peripheral vision, i.e., behind the pilot, is not necessary.

There are five primary components to an Artificial Horizon Altitude Warning System as illustrated in FIG. 1: (1) aircraft AGL altimeter 20 and descent rate indicator 22, if aircraft is so equipped; (2) artificial horizon projector controller 14; (3) artificial horizon projectors 24; (4) a display 26 on for example, a canopy or cockpit window 28; and (5) artificial horizon cockpit control panel 12. This AHAWS system 10 is intended to operate via inputs supplied by the aircraft's existing altitude indicator 20 and/or ground proximity warning system. The aircraft's AGL altitude 20 and descent rate 22 are fed to the artificial horizon projector controller where they are combined with aircraft attitude input 18. An elevation algorithm in the artificial horizon projector controller 14 determines the projection parameters of the artificial horizon based on cockpit geometry and pilot eye position. Thus, a conventional controller 14 may be used so long as it is capable of having the software modified to accept the above described elevation algorithm. The number of artificial horizon projectors 24 and their location is based on the cockpit geometry and size. The three projectors 24 shown in FIG. 1 are for illustrative purposes only. The AHAWS system 10 is to be customized for different aircraft cockpits. The accuracy of super-position of the projected horizon onto the real horizon is dependent upon the pilot's eye position. Therefore projector controller 14 must allow for horizon elevation adjustment based on the pilot's sitting height or, more accurately, the pilot's eye level. Once the pilot has selected his sitting position, the system is temporarily activated on the ground so that the artificial horizon elevation can be manually adjusted by dial 34 on control panel 12. This adjustment would consist of superimposing the artificial horizon over the actual horizon. For multi-piloted aircraft, horizon projector controller 14 must also have the ability to reorient the projection for each pilot based on their eye positions. This would require a manual selection 38 on control panel 12 by the pilots to indicate for which pilot the projection is required. Projector controller 14 must use redundant control circuits with built-in testing for safety. If the system fails to pass internal testing, the projectors would be deactivated for fail-safe.

As stated above, the AHAWS concept utilizes existing aircraft technology and marries the diverse technologies into a single efficient system. For example, control panel 12 may be easily modified from an Environmental Control Panel purchased from Honeywell Inc. of Albuquerque, NM as part number 4031000-920. Projector controller 14 may be purchased from Garrett Manufacturing Limited of Toronto, Ontario, Canada with nomenclature of PVHD Controller. Radar Altimeter 20 may be purchased from Allied Signal Inc. of Teterboro, NJ as part number 501-1665-01. Finally, laser projector 24 may be purchased from Garrett Manufacturing Limited of Toronto, Ontario, Canada as part number 0312-1A. It should be appreciated that the above parts are merely illustrative of one AHAWS system and that each AHAWS system will be configured for the preexisting components of each aircraft.

Figure 2:
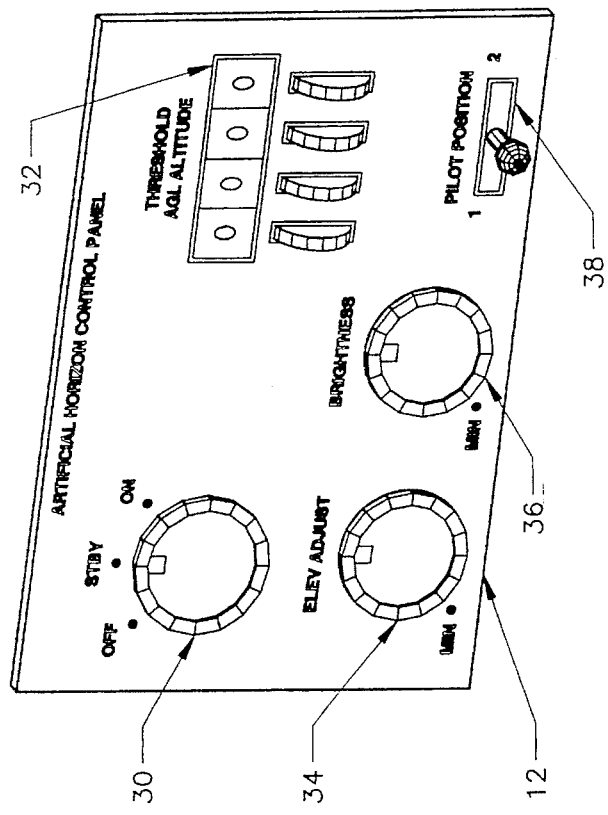
FIG. 2 is a front elevational view of a cockpit control panel for the artificial horizon altitude warning system of FIG. 1.
Figure 3:
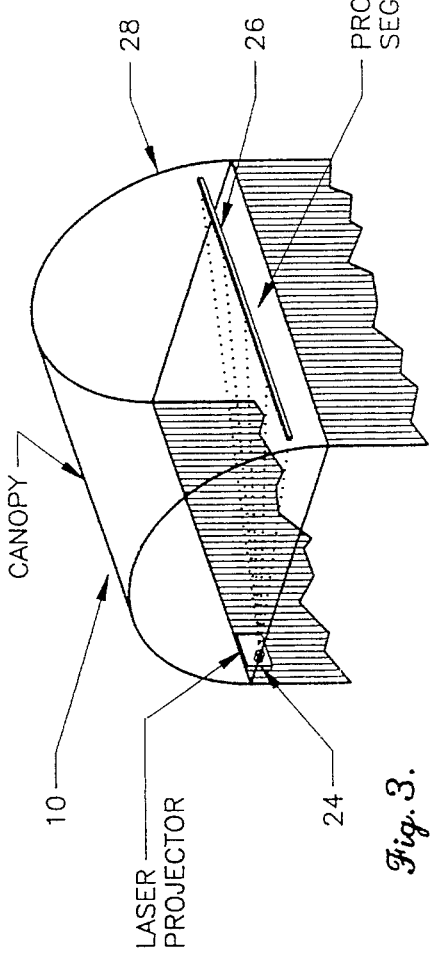
FIG. 3 is a perspective view of the cockpit of an aircraft which is equipped with the altitude warning system of FIG. 1.

Modifications to existing components will be described below. Existing PVHD controls consist primarily of an on/off switch and a brightness control by a knob 36 on panel 12. The AHAWS requires a few additional controls. FIG. 2 illustrates a simple example of an AHAWS cockpit control panel 12. A three-place switch 30 would activate the system. In the "off" position the system would be deactivated. In the "on" position, the system 10 would be activated with an artificial horizon display 26 projected inside the cockpit 28. A warning function would also be armed. This warning function is described in greater detail below. Between the "off" and "on" position would be a "standby" position. In the standby mode, the warning function would be armed but projectors 24 would be off during normal flight conditions. However, if altitude/descent rate threshold is exceeded, the warning function would be activated and projectors 24 would be turned on immediately at full brightness. A manual elevation adjustment control 34 is used to calibrate the artificial horizon display 26 before flight for individual pilot sitting height. A manual brightness control 36 would allow selection of projected display intensity. In an alternate embodiment, the artificial horizon display 26 may also be tied to the existing instrument panel intensity control or an ambient light sensor. However, a manual brightness control should be included for pilot preference. Brightness selection would be overridden if the warning function were activated while in the "standby" mode to ensure that the display is sufficiently bright to stimulate a reaction in extremis. To control the warning function activation, an AGL altitude threshold 32 would be entered in feet. This would be required for aircraft that do not have existing pilot selectable altitude warning systems. The altitude threshold 32 may also work in concert with aircraft that have independent altitude warning threshold selection as a second threshold or backup. If the aircraft is equipped with a descent rate input 22 or sophisticated dive recovery warning system, these parameters would be used to activate the AHAWS in addition to or in place of the AHAWS. The AHAWS system 10 is intended to be used at night or during periods of limited visibility to complement and enhance the original spatial orientation purpose of the artificial horizon. In flight situations where the real horizon is not visible, such as landing approaches at night or in poor visibility, the AGL altitude controlled artificial horizon display 26 would provide a compelling and instinctive indication of descent and ground proximity similar to that experienced during high visibility day flight. In flight conditions of low altitude maneuvering where approach to landing is not required, a warning system that exaggerates ground proximity when a pilot selectable threshold is surpassed provides an additional safe margin for pilot reaction.

The AHAWS may use an artificial horizon controller and laser projector similar to current PVHDs, but with the following modifications. The primary difference between the AHAWS and current PVHD systems are as follows: (1) the artificial horizon is superimposed over the real horizon by projecting it directly onto the cockpit canopy, windows or walls; (2) altitude and descent rate are added to attitude input to allow the artificial horizon to rise or descend with the real horizon; and (3) a pilot-selectable warning mode is included to exaggerate peripheral cues of descent rate and ground proximity in extremis.

Extending the horizon display 26 into the periphery has the added advantage of allowing the pilot to use night vision goggles and still take advantage of peripheral vision orientation and altitude perception. Night vision goggles have a narrow central field of view but allow sufficient unamplified peripheral vision, around the night goggle's eye piece, for subconscious perception of a wide field artificial horizon.

AHAWS may also be useful during low altitude tactical flights when the real horizon is well-defined. This would require an extremely bright artificial horizon display. With a high contrast between the artificial and real horizon, there may be sufficient stimulus to override the real horizon's peripheral cues in the subconscious.

There are two primary methods for presenting an AHAWS to a pilot. The first method involves projection of the artificial horizon on the inside of the cockpit as illustrated above. An alternate method is helmet-mounted projection of the horizon onto the helmet visor. This method requires an extremely wide field of view helmet mounted HUD to stimulate peripheral vision.

Existing PVHDs project a laser onto the front instrument panel of the cockpit for spatial orientation. They use either internal attitude gyroscopes or the aircraft's own attitude system for input. Most PVHDs project a fixed continuous laser beam via small multiple servo-actuated mirrors. The actuators controlling the mirror positions are driven by a controller that converts the aircraft's attitude into a simulated horizon line. The rapid and coordinated movement of the mirrors allows the laser to rapidly "draw" a line representing a horizon. The speed of the laser trace allows human persistence of vision to perceive the trace as a continuous line. Examples of prior art PVHDs include U.S. Pat. Nos. 4,616,226; 4,743,903; 5,21.8,355; and 5,072,218. These patents are hereby incorporated by reference.

The first modification required for an AHAWS extends the artificial horizon into the pilot's periphery. This is accomplished by "drawing" the artificial horizon onto the canopy or cockpit windows and walls 28. In most cockpits, this requires multiple projectors 24 located around the periphery of the cockpit. The canopy or windows 28 are treated with a coating that reflects only the narrow frequency band of the laser light with minimal degradation of external light transmission. This may be accomplished by several existing methods. Current HUD technology uses a holographic coating to reflect a narrow band of light frequency projected upon it without obscuring the pilot's view through the HUD combiner glass. Covering the cockpit windows or canopy with a holographic film such as that produced by Kaiser Electronics of San Jose, CA as a holographic optical coating used on their HUD. Another method uses multilayers half wavelength coatings similar to those used on computer cathode ray tubes to prevent reflection. A multilayered half-wavelength coating may be applied to the inside of the canopy or cockpit windows 28. The number of half-wavelength coatings would vary depending on the laser angle of incidence. Both techniques allow for low power projection lasers 24 and minimize release of laser light from inside the cockpit.

The second modification adds a third degree of freedom of motion. The Malcolm Horizon and PVHDs were designed to simulate the real horizon in two axis of motion, i.e., roll and pitch. To stimulate a subconscious altitude reaction in a pilot requires the addition of a third degree of motion. The plane of the artificial horizon must be able to rise and fall with the real horizon in addition to pitching and rolling. FIG. 4c illustrates elevation of the horizon with respect to the pilot's viewpoint as the aircraft's altitude decreases. The artificial horizon's elevation is controlled such that from the pilot's perspective, the artificial horizon remains superimposed over the position of the actual horizon regardless of altitude. The geometric relationship between altitude and the visual horizon is shown by the equation:

$$x = \sin^{-1}\left[\frac{R}{A+R}\right]$$

where, x is the visual horizon angle, R is the radius of the earth, and A is the altitude of the aircraft. The visual horizon angle is measured from a line extending from the pilot's eye to the horizon and from the pilot's eye to the center of the earth. With the pilot's chin on the ground, the visual horizon angle would be 90°. With infinite altitude, the visual horizon angle would be 0°. The above equation is added to the existing roll and pitch algorithm in the artificial horizon projector controller 14 to allow the artificial horizon a third degree of motion.

FIGS. 4a and 4b illustrate the effects of aircraft roll and pitch on the artificial horizon display 26. As may be seen, display 26 is aligned with the actual horizon regardless of the pitch or roll of the aircraft. Thus, a pilot may rely on the innate reference between the pilot and the display 26 to determine the current orientation of the aircraft with respect to the actual horizon. Thus, no retraining is necessary since most pilots learn to fly by utilizing the visual clues provided by an actual horizon.

Figure 5:
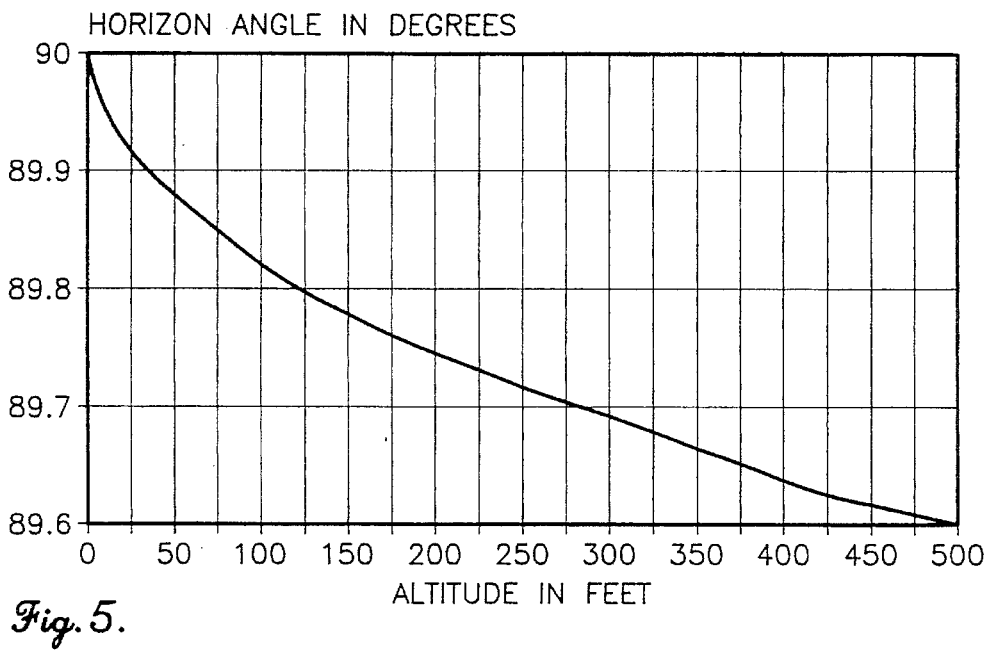
FIG. 5 is a graph of visual horizon angle versus altitude for a situation where an aircraft is flying at low altitudes.
Figure 6:
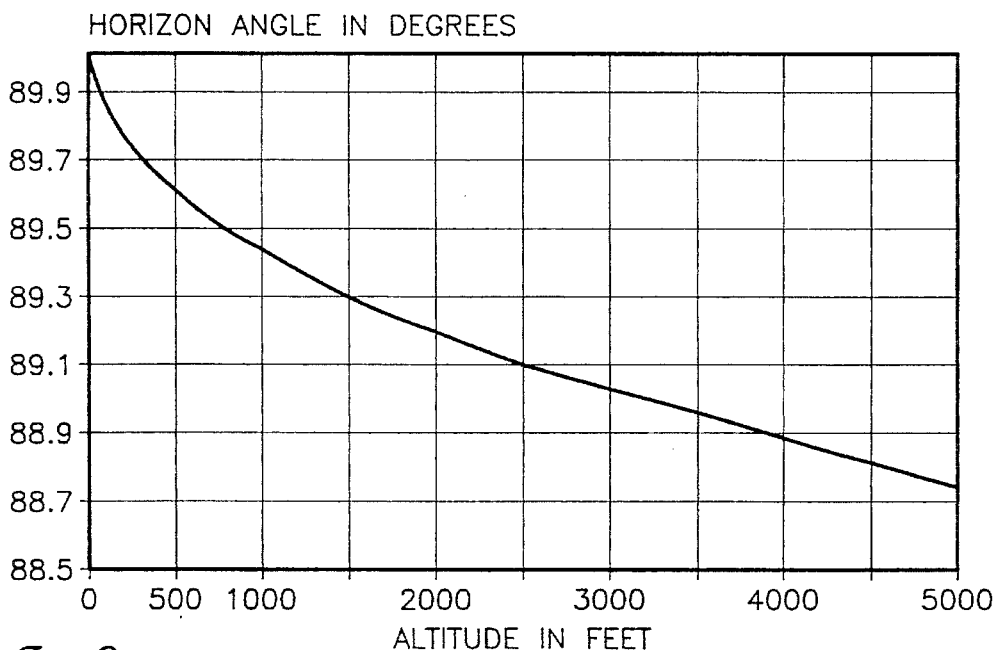
FIG. 6 is a graph of visual horizon angle versus altitude for a situation where an aircraft is flying above low altitudes.

FIGS. 5 and 6 are plots of the visual horizon angle versus the Above Ground Level AGL altitude. As may be seen, the curve is non-linear. The rate of change of the visual horizon angle increases as altitude decreases with a very rapid increase at altitudes below 100 feet. This rapid increase in angular rate at low altitude provides the subconscious with cues for gauging ground proximity in addition to descent rate.

In addition to the general ground proximity indication, a warning function may be added to the system. During high speed, low altitude maneuvering flight, the real horizon's peripheral indication of impending ground impact often comes too late. Preferably, the artificial horizon display 26 is rapidly elevated before the real horizon fatally confirms ground proximity. This accelerated elevation of artificial horizon display 26 would imitate the rapid increase in angular rate seen in FIG. 5 at altitudes less than 100 feet, thereby subconsciously indicating impending ground impact. This is the only situation where elevation of the artificial horizon would not correspond directly to the real horizon's position. The activation threshold for the warning function would be based on a pilot selected minimum altitude 32, or if the aircraft is so equipped, a preexisting altitude and descent rate device. The threshold would be set such that without immediate pilot action, ground impact would occur.

For example, an aircraft is engaged in low altitude maneuvering flight at night. The pilot's minimum intended altitude might be 150 feet AGL. The AHAWS's pilot selected warning threshold could be set at 75 feet AGL. The AHAWS continues to provide an artificial horizon superimposed over the position of the invisible real horizon until the aircraft goes below the selected threshold altitude, in this case 75 feet AGL. When the warning threshold conditions are met and the warning function is activated, the artificial horizon controller no longer superimposes the artificial horizon over the real horizon. Instead., it quickly elevates it above this position. This elevation exaggerates descent rate and ground proximity. The pilot's peripheral vision subconsciously detects and interprets the rapidly elevated horizon as an impending impact, stimulating an immediate response. To prevent activation of the warning function during an approach to landing, this mode would be disabled when the aircraft is in the landing configuration, i.e., landing gear has been lowered. It should be appreciated that normal AHAWS operation will remain active while landing.

The warning function may include a descent rate in concert with a minimum altitude, if the aircraft is so equipped. For example, the warning function might also be set to activate if the aircraft goes below 100 feet AGL with a 1500 foot per minute descent rate. Under these conditions, ground impact would occur in 4 seconds, allowing only a few seconds to react and the remainder for arresting the descent rate. If the aircraft is equipped with a sophisticated dive recovery warning system, as are many ground attack aircraft, existing dive recovery criteria may be used to activate the warning. Dive angle may be included in impending impact calculations. From 100 feet AGL at 500 knots true airspeed with only a 2° dive angle, ground impact will occur in 3.4 seconds. 250 knots with a 4° dive angle will give the same time impact as exemplified in Table 3.

TABLE III

Time to Impact from 100 feet AGL (seconds).

| KNOTS | DIVE ANGLE IN DEGREES | | | |
| --- | --- | --- | --- | --- |
| | 1° | 2° | 3° | 4° |
| 250 | 13.6 | 6.8 | 4.5 | 3.4 |
| 500 | 6.8 | 3.4 | 2.3 | 1.7 |

| G's | BANK ANGLE IN DEGREES | | | |
| --- | --- | --- | --- | --- |
| | 30° | 60° | 90° | 120° |
| 1 | 6.8 | 3.5 | 2.5 | 2.0 |

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An artificial horizon warning system for an aircraft containing an altitude measuring and or ground proximity devices which provides a warning when a controlled flight of the aircraft will result in a collision with the ground, said system comprising:

means for gathering altitude information about said aircraft from said altitude and proximity measuring device and generating an altitude signal;

laser light generating means for producing at least one ray of laser light in a cockpit of said aircraft; and control means for receiving said altitude signal and for positioning one ray of said light in said cockpit to form an artificial line based on said altitude signal, said artificial line being positioned so as to be disposed along an arcuate length corresponding to the location of an actual horizon as viewed by a pilot of said aircraft wherein said artificial line is disposed at the intersection of said one ray of said light and said cockpit, said one ray of light being defined by a visual horizon, angle, said visual horizon angle being defined by:

$$x = \sin^{-1}\left[\frac{R}{A+R}\right]$$

where, x is said visual horizon angle, R is the radius of the earth, and A is the altitude of said aircraft, said visual horizon angle being measured from a line extending from a pilot's eye to the horizon and from said pilot's eye to the center of the earth.

2. The warning system recited in claim 1, further comprising means for determining descent rate and sending a descent rate signal to said control means.

3. The warning system recited in claim 2 wherein said control means receives said descent rate signal in combination with said altitude information, said control means for rapidly moving said artificial line above said actual horizon when said descent rate exceeds a predetermined value.

4. The warning system recited in claim 1 wherein said artificial line is projected on a canopy of said aircraft.

5. The warning system recited in claims 4 wherein said canopy is coated with a film that reflects only the projected artificial horizon display.

6. The warning system recited in claim 1, further comprising means for gathering attitude information about said aircraft and means for transmitting said attitude information to the control means, said attitude information comprising at least pitch and roll information.

7. The warning system recited in claim 6 wherein said control means receives said altitude signal and attitude information and positions said one ray of light in said cockpit to form said artificial line based on said altitude and attitude information, said artificial line being positioned so as to be disposed along said arcuate length corresponding to the location of said actual horizon as viewed by said pilot of said aircraft.

8. The warning system recited in claim 1 wherein said control means rapidly moves said artificial line above said actual horizon when said altitude signal falls below a predetermined value.

9. An artificial horizon warning system for an aircraft which provides a warning when a controlled flight of the aircraft will result in a collision with the ground, said system comprising:

means for gathering altitude information about said aircraft;

means for gathering attitude information about said aircraft, said attitude information comprising at least pitch and roll information;

light generating means for producing at least one ray of light in a cockpit of said aircraft; and control means for receiving said altitude and attitude information and for positioning said light in said cockpit to form an artificial line based on said altitude and attitude information, said artificial line being positioned so as to be disposed along an arcuate length in said cockpit, wherein said artificial line is disposed at the intersection of a ray of said light and said cockpit, said ray being defined by a visual horizon angle, said visual horizon angle being defined by:

$$x = \sin^{-1}\left[\frac{R}{A+R}\right]$$

where, x is said visual horizon angle, R is the radius of the earth, and A is the altitude of said aircraft, said visual horizon angle being measured from a line extending from a pilot's eye to the horizon and from said pilot's eye to the center of the earth.

10. The warning system recited in claim 9, further comprising means for determining descent rate and outputting a descent rate signal.

11. The warning system recited in claim 10 wherein said control means receives said descent rate signal in combination with said altitude information, said control means for rapidly moving said artificial line above said actual horizon when said descent rate exceeds a predetermined value.

12. The warning system recited in claim 9 wherein said artificial line is projected on a canopy of said aircraft.

13. The warning system recited in claim 12 wherein said canopy is coated with a film that reflects only the projected artificial horizon display.

14. The warning system recited in claim 9 wherein said control means rapidly moves said artificial line above said actual horizon when said altitude signal falls below a predetermined value.

15. A method for providing a warning when a controlled flight of an aircraft will result in a collision with the ground, said method comprising the steps of:

(a) generating a signal indicative of an altitude of said aircraft;

(b) projecting a ray of laser light from a light source on a cockpit so that said light source forms an artificial line based on said altitude signal, said artificial line being positioned so as to be disposed along an arcuate length corresponding to the location of an actual horizon as viewed by a pilot of said aircraft; and (c) dynamically adjusting said artificial line so as to be disposed at the intersection of a ray and said cockpit, said ray being defined by a visual horizon angle, said visual horizon angle being defined by:

$$x = \sin^{-1}\left[\frac{R}{A+R}\right]$$

where, x is said visual horizon angle, R is the radius of the earth, and A is the altitude of said aircraft, said visual horizon angle being measured from a line extending from a pilot's eye to the actual horizon and from said pilot's eye to the center of the earth.

16. The method recited in claim 15, further comprising the step of: rapidly moving said artificial line above said actual horizon when said altitude signal falls below a predetermined value.

17. The method recited in claim 15, further comprising the steps of:

(a) generating a signal indicative of descent rate of said aircraft; and (b) rapidly moving said artificial line above said actual horizon when said descent rate exceeds a predetermined value.

18. The method recited in claim 15, further comprising the steps of:

(a) generating a second signal indicative of the attitude of said aircraft; and (b) forming said artificial line based on both said altitude signal and said attitude signal, said artificial line being positioned so as to be disposed along said arcuate length corresponding to the location of said actual horizon as viewed by said pilot of said aircraft.

* * * * *